United States Patent [19]
Yamauchi

[11] Patent Number: 6,021,676
[45] Date of Patent: Feb. 8, 2000

[54] INSTRUMENT FOR MEASUREMENT OF BASEMENTROCK'S DEFORMATION

[75] Inventor: Tsuneo Yamauchi, Nagoya, Japan

[73] Assignee: Techno Togo Limited Company, Mino, Japan

[21] Appl. No.: 08/646,937

[22] Filed: May 8, 1996

[51] Int. Cl.[7] .................................................. G01B 7/16
[52] U.S. Cl. ................... 73/782; 73/781; 73/764
[58] Field of Search .............................. 73/764, 765, 768, 73/781, 782, 786, 806

[56] References Cited

U.S. PATENT DOCUMENTS

| | | | |
|---|---|---|---|
| 3,206,970 | 9/1965 | Dally et al. ................................ | 73/780 |
| 3,388,590 | 6/1968 | Dryden ....................................... | 73/774 |
| 3,729,985 | 5/1973 | Sikorra ....................................... | 73/780 |
| 4,701,660 | 10/1987 | Baumgartner et al. ................... | 73/774 |
| 5,115,680 | 5/1992 | Lew ........................................... | 73/782 |

Primary Examiner—Max Noori

[57] ABSTRACT

A devised strain meter detects displacement on the lateral side of the receptacle after magnification of the displacement by a lever in the receptacle. A cavity exists near the middle of the receptacle with a lever and a detector along the lateral side of the receptacle of the strain meter. Wires for signal and power lines of other strain meters are easily passed through this cavity. This mechanism with a cavity near the middle of the receptacle is very useful for an array observation of strain in the ground and/or in a solid construction.

1 Claim, 13 Drawing Sheets

INSTRUMENT FOR MEASUREMENT OF BASEMENTROCK'S DEFORMATION

BACKGROUND OF THE INVENTION

The present invention relates to a strain meter which is used in the ground and in a solid construction. It is not so easy to make a measurement of a very -small expansion or contraction, because a signal caused by such displacement is too small to exceed the detection sensitivity of a detector, especially for a small size strain meter.

In order to measure strain in the ground and/or in a solid construction, the instrument and ground and/or solid construction must come into closer contact using cement. A cylindrical closed receptacle has generally been used for the strain meter in a borehole, making it impossible to install multiple instruments in the same borehole.

SUMMARY OF THE INVENTION

The present invention concerns a strain meter. The devised strain meter utilizes a lever which is placed in a receptacle. The invention was also devised for a borehole. The strain meter is characterized by having a hollow part near the middle of the receptacle where wire lines for another strain meter can be inserted.

BRIEF DESCRIPTION OF THE DRAWINGS

The invention disclosed herein will be better understood with reference to the following drawings. The devised strain meters are characterized by a leverage mechanism inside a receptacle to magnify a displacement of the ground and/or in a solid construction, and by an arrangement of the lever and detector along the lateral wall of the receptacle.

FIG. 1 is a view in perspective of a strain meter which detects very small levels of expansion and contraction. A side wall of the cylindrical receptacle is placed in contact with the ground and/or the solid construction with cement. Numerals 10 and 20 mark arms which are fixed on the side wall of the receptacle to detect a displacement between two points shown by numerals 30 and 40. Numeral 12 is a wire for detector 11, and numeral 13 is a wire for the detector of another strainmeter of the same type which is set up in the lower part of the borehole.

FIG. 2 is a cross-sectional view of the strain meter along line 1—1 of FIG. 1. Arm 20 comes in contact with arm 10 at point 50. Numeral 60 of arm 10 is a thin board of metal. The displacement to the right and left is detected by detector 70 which is installed on the top of arm 10 after a magnification by leverage mechanism. Numeral 80 is a reference point.

FIG. 3 is a view in perspective of the water level gage of which the explanatory illustration using this leverage. Numeral 90 of arm 100 is also a thin board of metal. When the lever is used in the receptacle, a very small displacement of thin metal plate 110 can be detected, which is the displacement on a side wall of the receptacle caused by pressure changes of water level. Numeral 115 is a detector whose type is a magnetic displacement sensing transducer made by Macome Co., Ltd. (Japan): U.S. Pat. No. 4,788, 498.

FIG. 9 is a cross-section view along line 4B—4B of FIG. 8. A displacement of thin metal plate 140 is magnified by lever 150, and the displacement is detected by detector 160. Numeral 165 of lever 150 is also a thin board of metal.

FIG. 10 is a view in perspective of a strain meter in a borehole. Every side on the cylindrical receptacle is fixed in the ground and/or in the solid construction. Inside tube 170 on which many detectors are set up, is fixed on a cylindrical receptacle at point 180. There is a cavity near the middle of said strain meter.

FIG. 13 is a view in perspective of another strain meter in a borehole. Horizontal displacements are detected using inside semicircular rings 290 and 300 on which detectors 310, 320, are set up. Numeral 315 is a reference point corresponding to fixed point 330 and detector 310, respectively. Strains in two different directions are measured by detectors 310 and 320 along the lines from fixed point 330 to detector 310, and another fixed point 340 to detector 320. Numeral 311 is a wire for detector 310, and numeral 321 is a wire for the detector 320. Numerals 341 and 342 are wires for another strain meter of the same type which is set up in the lower part of the same borehole.

DETAILED DESCRIPTION OF THE INVENTION

The invention concerns to a strain meter to detect displacement after magnification by a lever which is placed in a receptacle. Very small expansion and contraction in the ground and/or in a solid construction can easily be detected by this new type strain meter.

Figure 1:
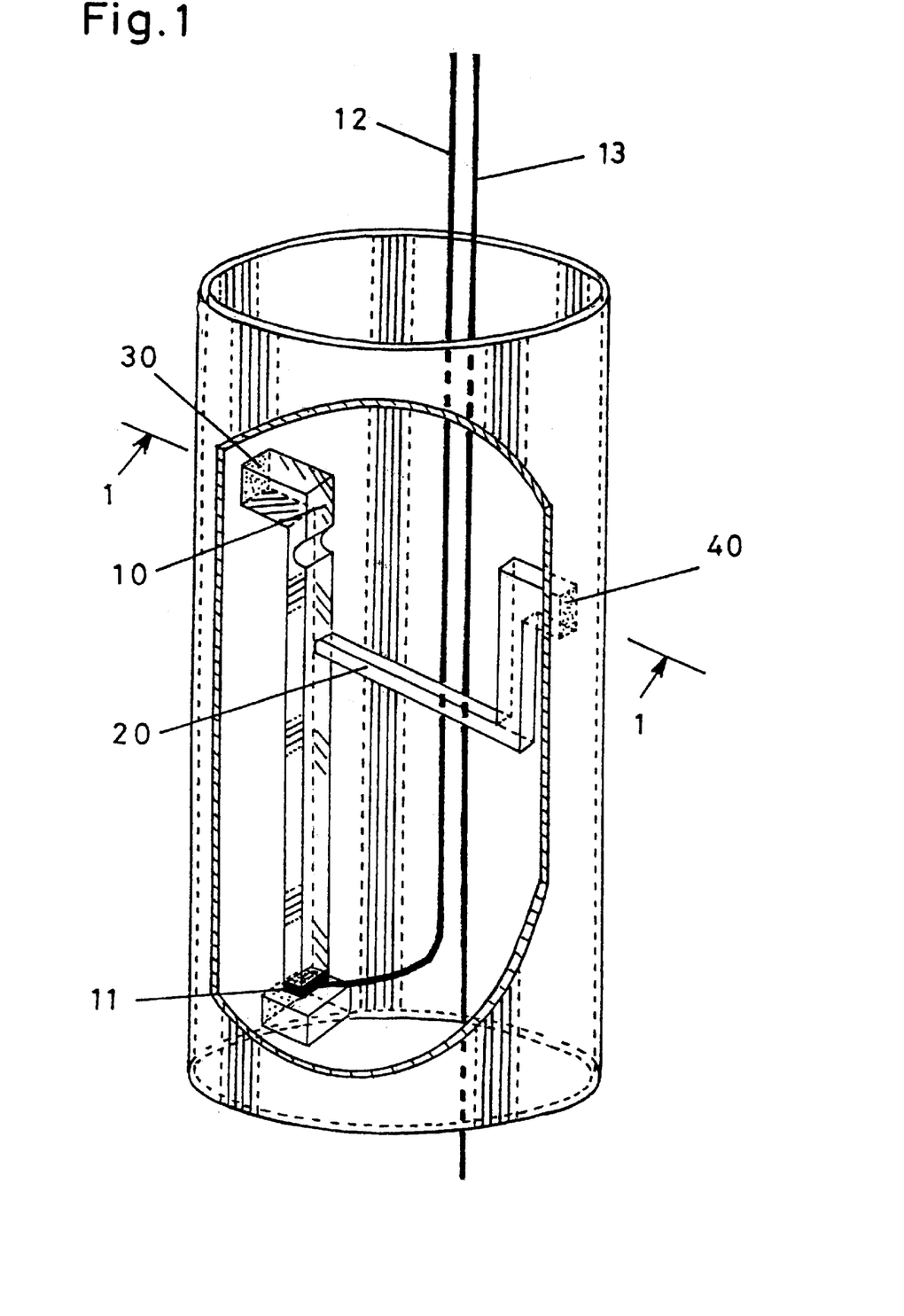
Figure 2:
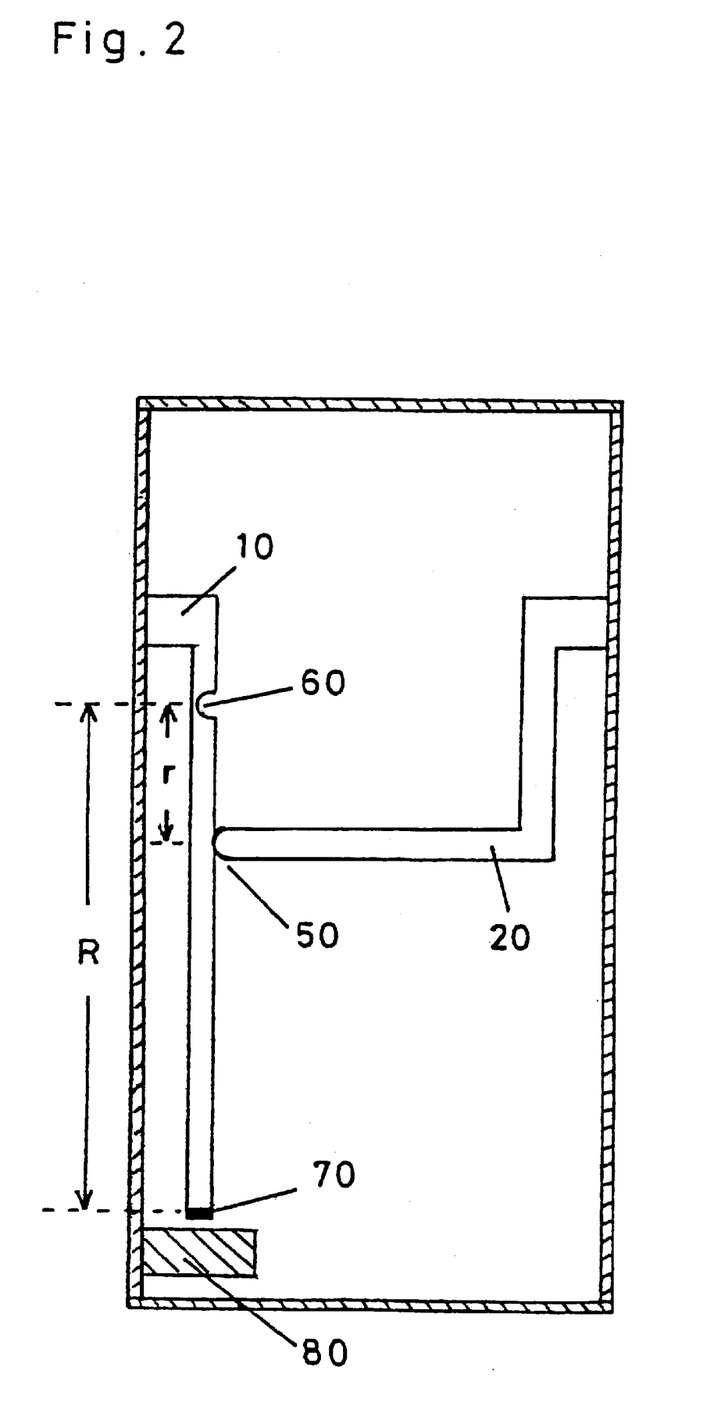

FIG. 1 is a view in perspective of a strain meter. FIG. 2 is a cross-sectional view of the instrument in which a displacement is detected after magnification by a lever. Numeral 60 of arm 10 is a thin board of metal which responds to a weak force by a smooth movement of the top of the arm 20. Two arms, 10 and 20, come in contact with each other at point 50, whose distance from point 60 is r. When displacement by x is registered between two arms 10 and 20, the top of arm 10 rotates around point 60 as the center of its rotation. The magnified displacement of the top of the arm is x*R/r, because the distance from point 60 to the top of arm 10 is R. The value of x*R/r divided by the diameter of the cylindrical receptacle is the amount of strain. If another pair of arms is installed in a different direction, then the strain in that direction can be measured. Numeral 12 is a wire for detector 11. Numeral 13 is a wire for the detector of another strain meter of the same type which is set up in the lower part of the borehole.

Figure 3:
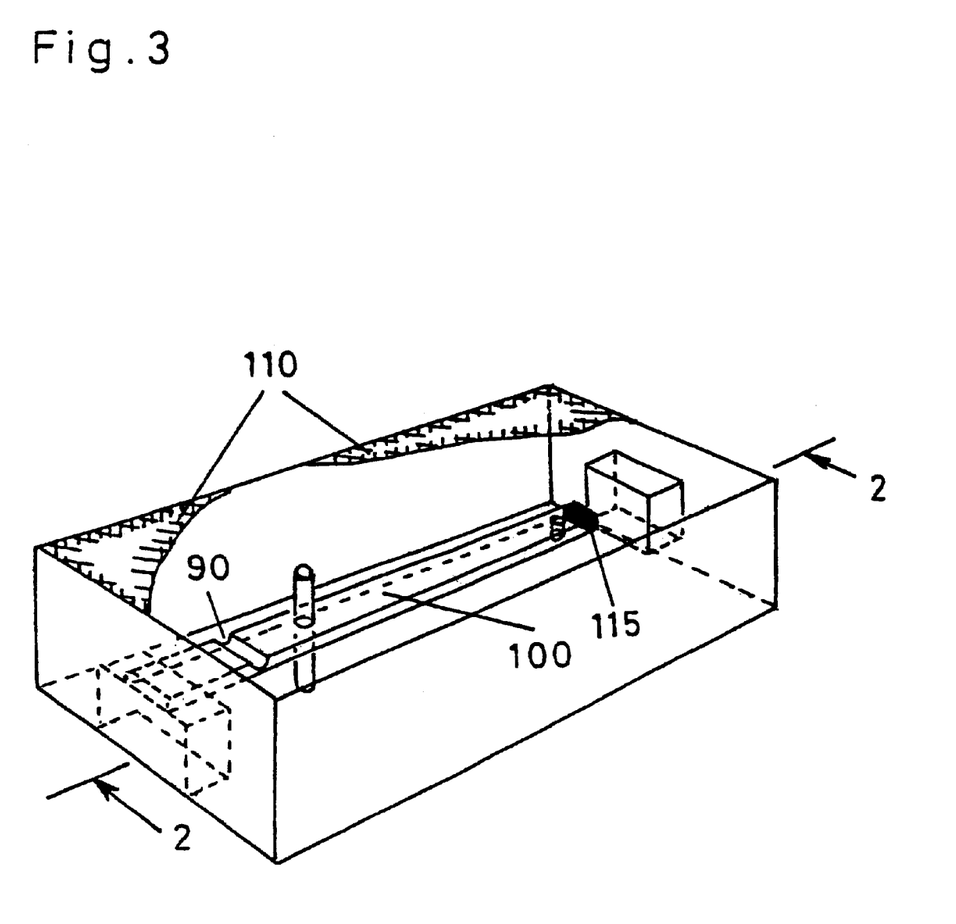
Figure 4:
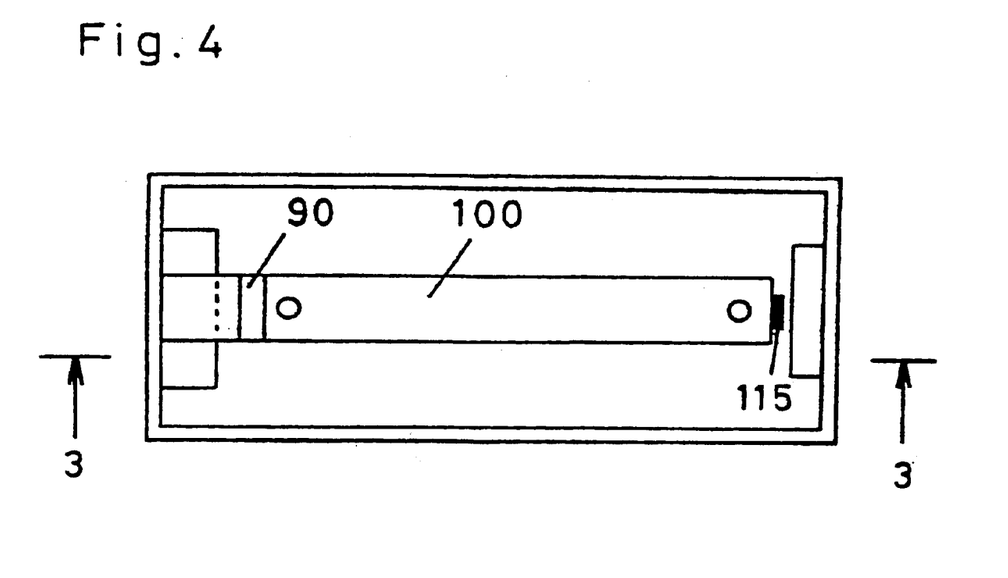
FIG. 4 is a top view of the gage.
Figure 5:
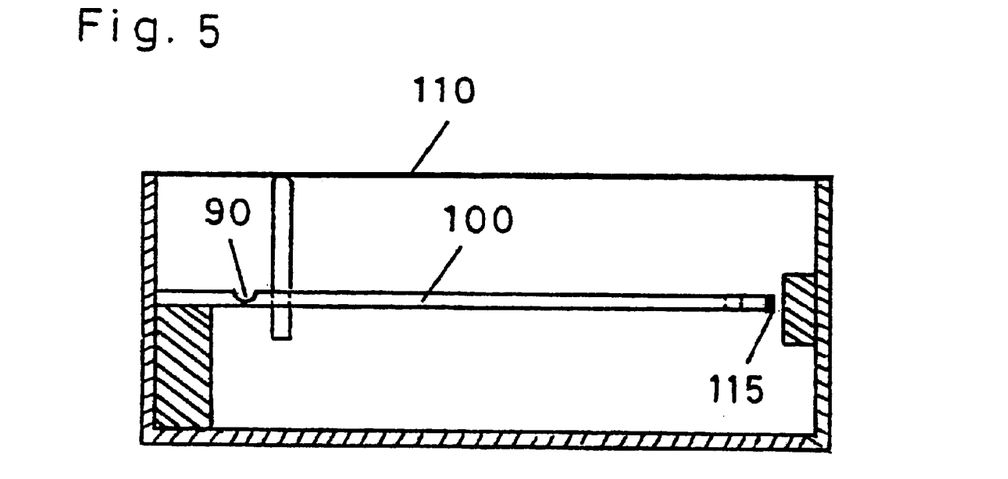
FIG. 5 is a cross-section view along line 2—2 of FIG. 3 or that along line 3—3 of FIG. 4.
Figure 6:
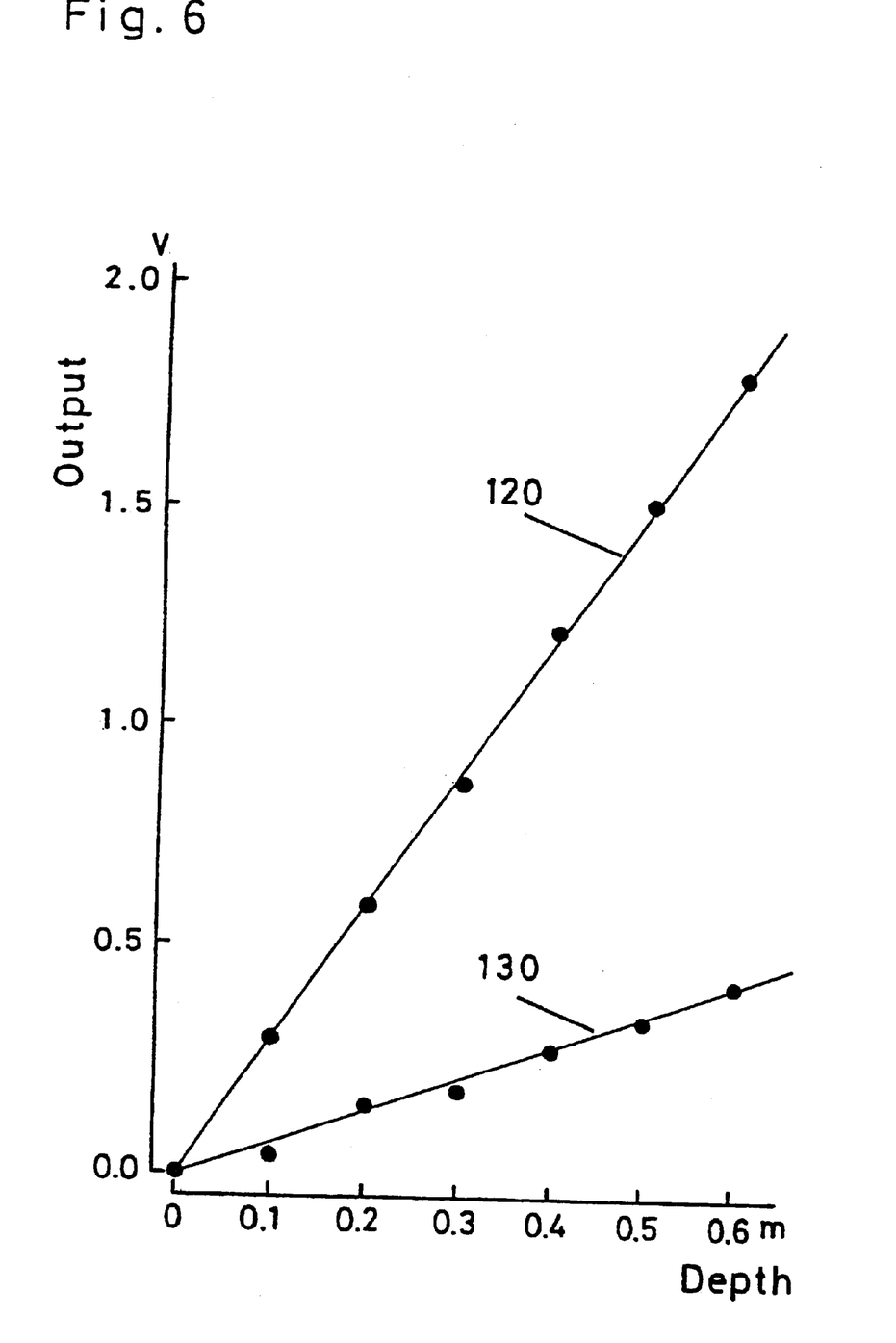
FIG. 6 shows an example of comparison between output signals of the water level gage. The signals caused by change of water level are obtained after magnification of the displacement on the thin metal plate of the water gage, using a lever shown in FIG. 3. The abscissa marks the output voltage, and the ordinate is the depth of water. Line 120 corresponds to the measured data by a large magnification factor of the displacement and line 130 corresponds to the measured data by a small magnification factor.

FIG. 3, FIG. 4 and FIG. 5 show a water level gage having a leverage mechanism inside the receptacle. Displacement on the upper wall made of 0.5 mm thick stainless steel is magnified by leverage mechanism and detected by detector 115. In this case, the magnetic displacement sensing transducer (made by Macome Co., Ltd. (Japan): U.S. Pat. No. 4,788,498) is used as a detector. An example of measurement of displacement using the lever is shown in FIG. 3. The displacement on the lateral side of the instrument is given by changes of water level. The abscissa marks the output voltage caused by the displacement and the ordinate is the depth of the receptacle from the water surface. Line 120 in FIG. 6 is an output voltage which was recorded after 5 times magnification of the displacement. Line 130 is an output which was recorded after 1.15 times magnification of the displacement. Detection of displacement after large magnification is easier than that after small magnification. This instrument has enough stability for measurement of water level with an accuracy level better than 0.5 mm. The thin board of metal used as the lever for the magnification of the displacement can be replaced by planed metal.

Figure 7:
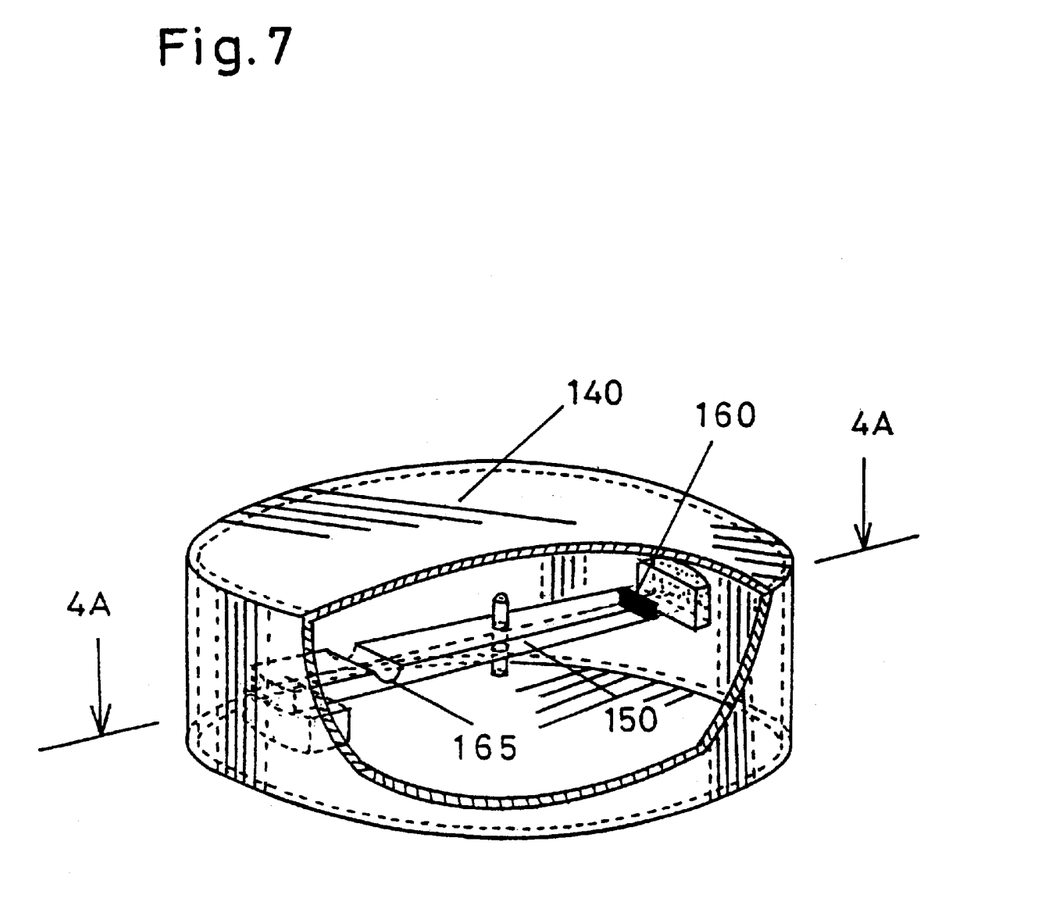
FIG. 7 is a view in perspective of another strain meter to detect very small expansion and contraction. A lever is also placed in the receptacle. In this case, the same type of magnetic displacement sensing transducer is also used as the detector.
Figure 8:
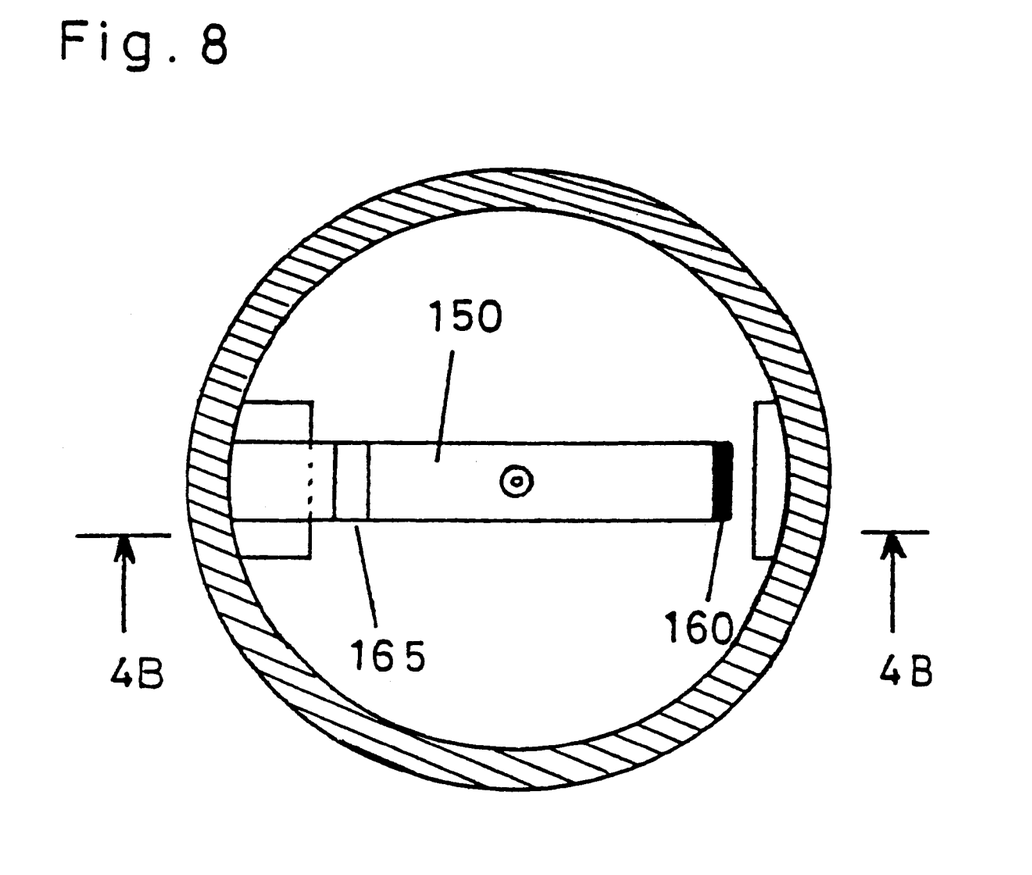
FIG. 8 is a cross-section view along line 4A—4A of FIG. 7 looking from top side.
Figure 9:
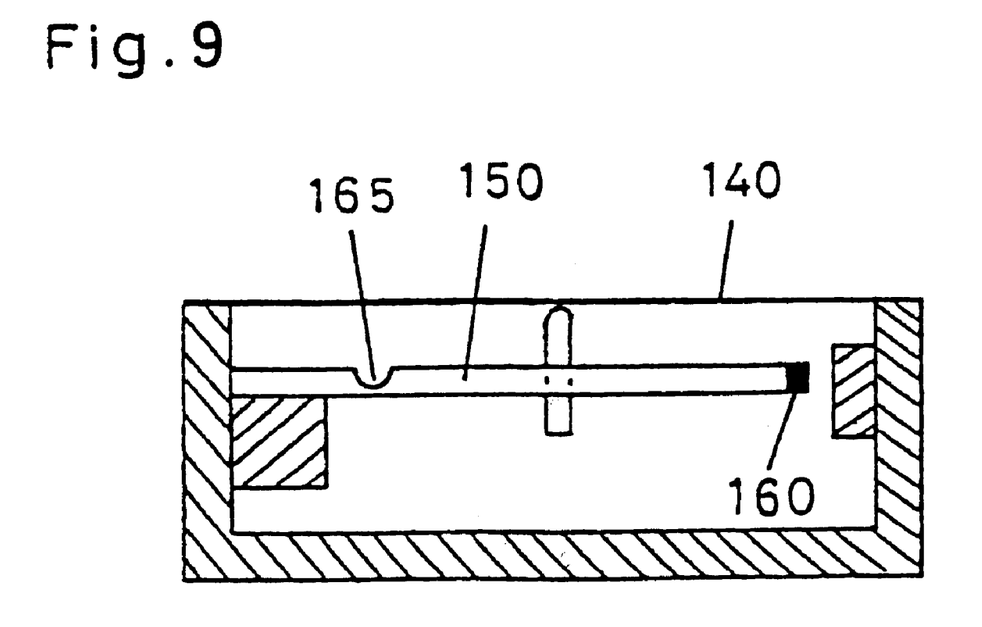

Although the invention has been shown in detail and described as a rectangular prism in FIG. 3, FIG. 4 and FIG. 5, various appearances, such as a cylinder in FIG. 7, FIG. 8, and FIG. 9, may be contemplated within the scope of the invention.

Many practical embodiments of the invention for strain measurement in a borehole are shown in FIGS. 10, 11, 12, 13, 14, and 15. Each strain meter is characterized by having a cavity near the middle of the receptacle, because the detectors of the strain meter are set up on the tube of semicircular ring placed along the lateral side of the receptacle, and wires for other strain meters can easily be passed through the strain meter.

Figure 10:
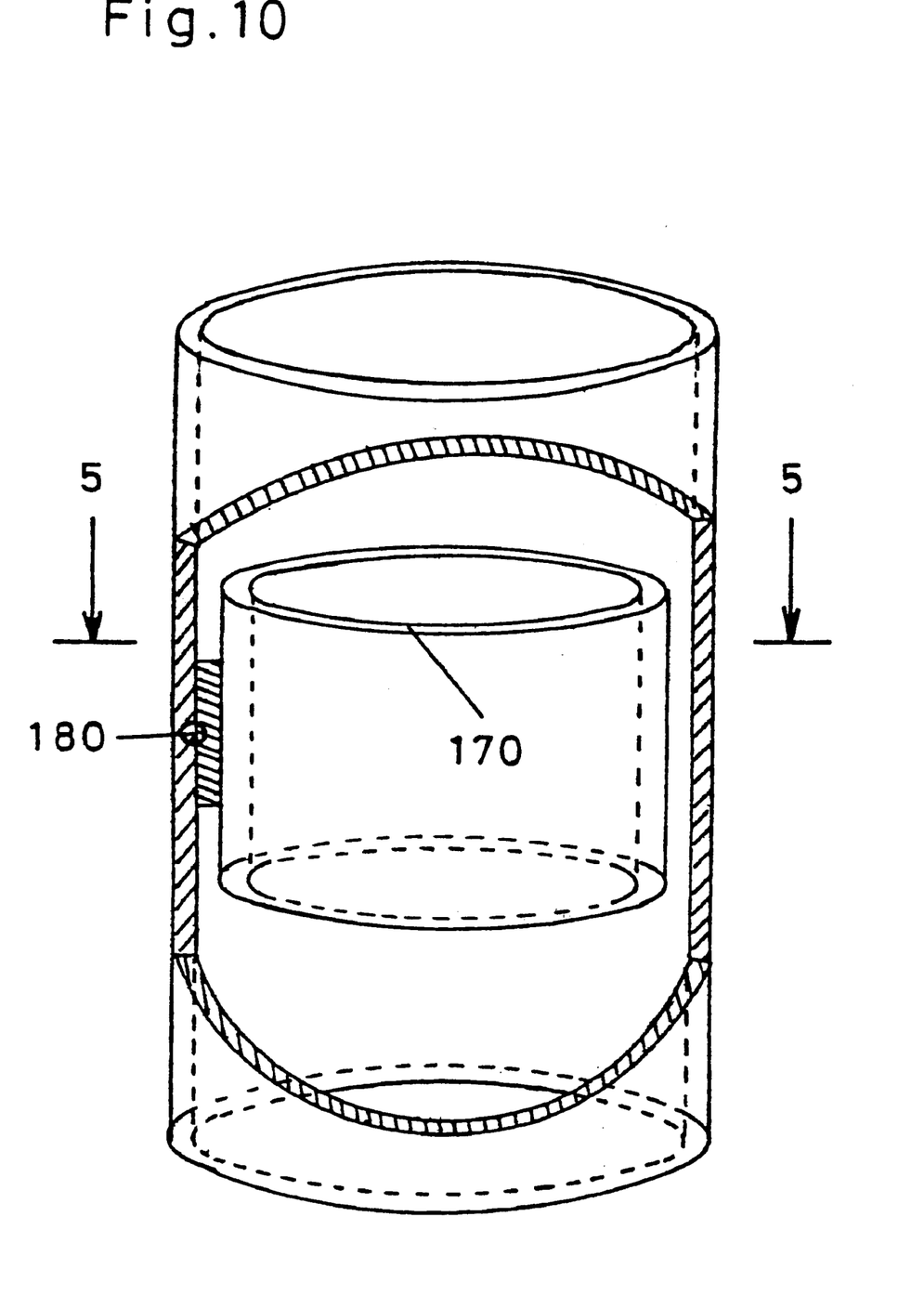
Figure 11:
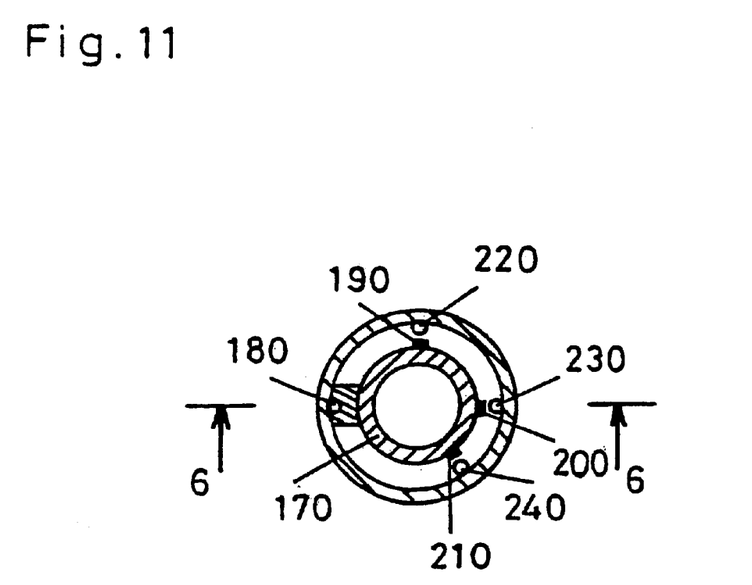
FIG. 11 is a cross-section view of the same strain meter along line 5—5 of FIG. 10, which is perpendicular to the axis of the receptacle. In this cross-section, there are detectors 190, 200, and 210 on tube 170. Displacement on the lines is measured along fixed point 180 to other reference points, such as in directions 180 to 220, 180 to 230, and 180 to 240 lines, using detectors 190, 200, and 210.
Figure 12:
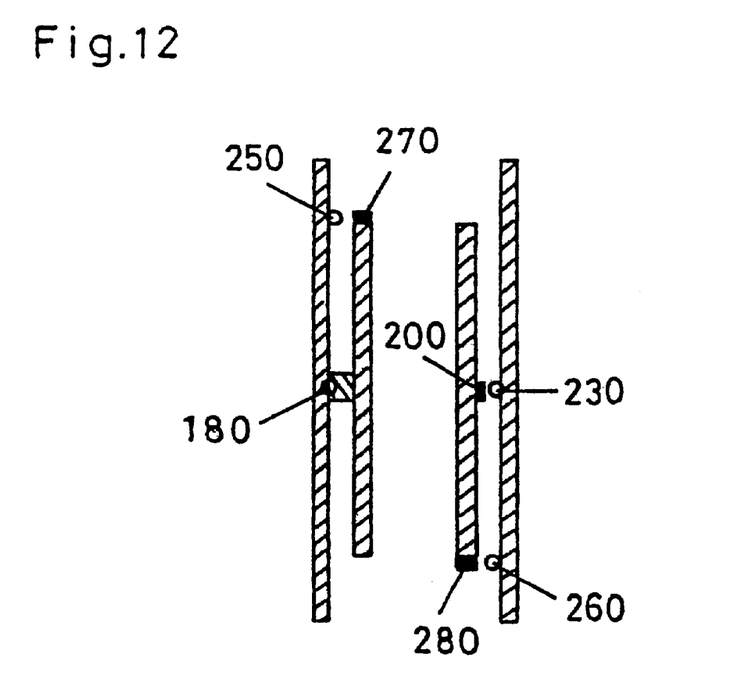
FIG. 12 is a cross-section view of the same strain meter along line 6—6 of FIG. 11, which is parallel to an axis of the receptacle. Displacement between the point 180 and reference points 250, 230, and 260 are measured using detectors 270, 200, and 280.
Figure 13:
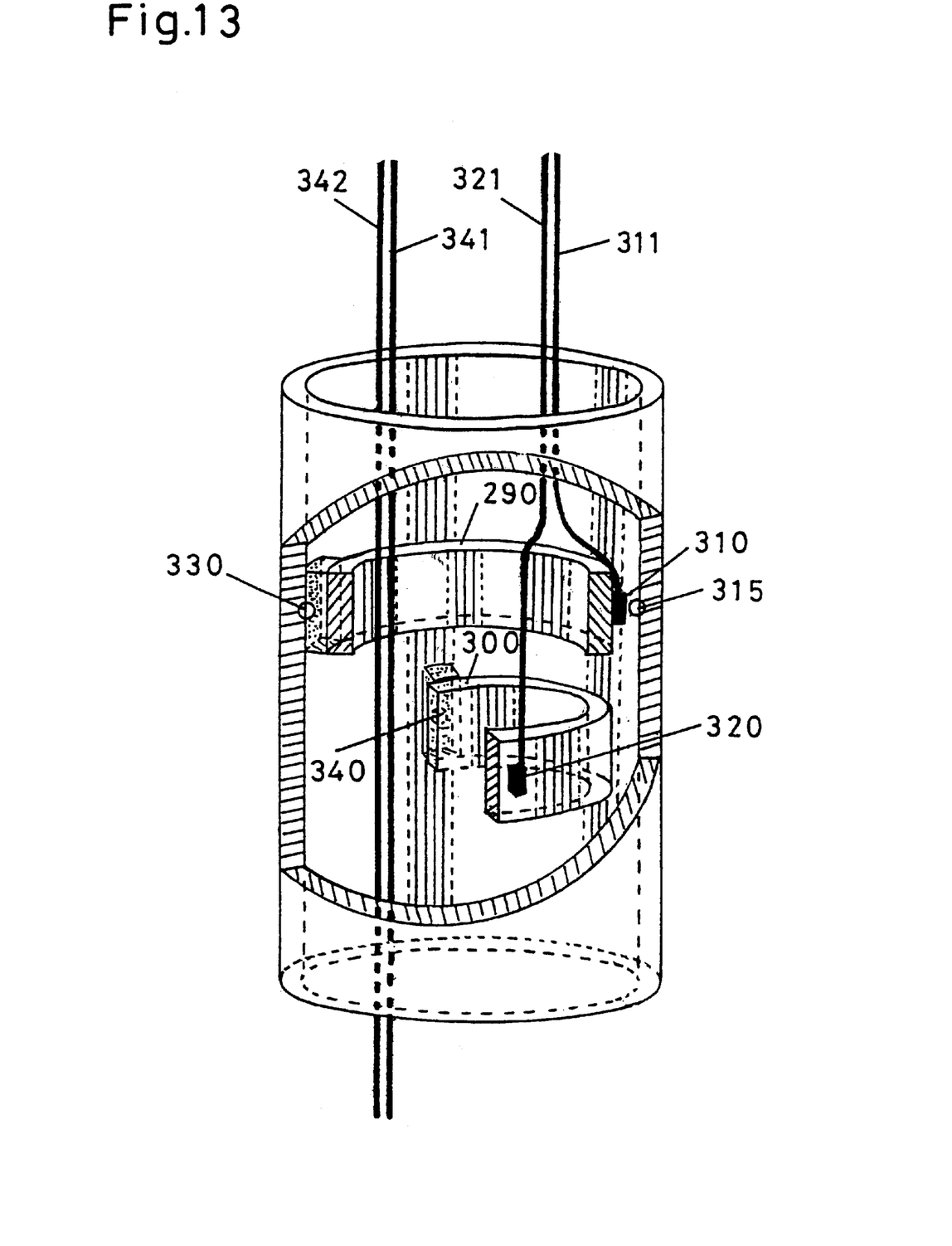
Figure 14:
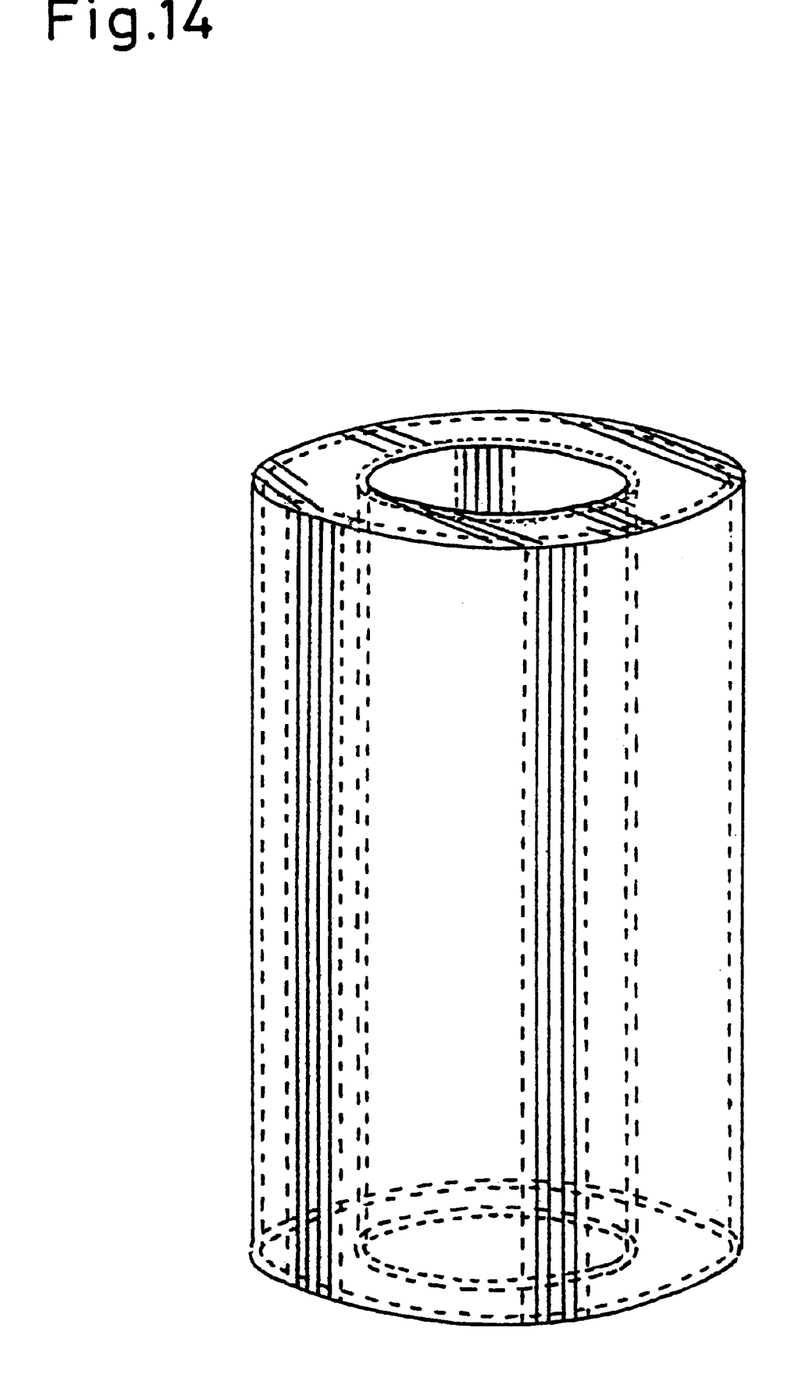
FIG. 14 is a view in perspective of a closed receptacle with a cylindrical cavity near the middle of the cylinder. Instruments are placed inside the receptacle so as to make a hollow space near the middle of the receptacle.

FIG. 10 is a perspective view of a strain meter embodying this invention. Tube 170, on which many detectors are set up, is fixed to the cylindrical receptacle at point 180. The axis of tube 170 holds the same direction with borehole's axis. FIG. 11 is a cross-section view of the same instrument perpendicular to the axis of the receptacle. FIG. 12 is a cross-section view of the same instrument including the center axis of the borehole. Strain can be calculated in the direction from fixed point 180 to reference point 220, by deviding the measurement result of the displacement between 180 to 220 by the distance from 180 to 220. Strain can also be obtained in the direction from the point 180 to reference point 230 by using the measurement results of detector 200. Strain can also be obtained in the direction from the point 180 to reference point 240 using detector 210. Fixed point 180 and reference points 220, 230, and 240 are situated on the same plane, and therefore strains can be detected in three different directions on the plane. Strains in a perpendicular direction and in an inclined direction are also obtained by detectors 270, and 280. This strain meter enables us to measure the multi-component strains using the same fixed point 180. FIG. 13 is a perspective view of a strain meter embodying the invention, characterized by using a part of tube as an arm. Strains in two directions are measured by this strain meter by two detectors 310, and 320. Displacements in both directions are easily detected, if their measurement is taken after magnifying in the way described in FIG. 2. When three arms are used as scales, the strain meter has the ability to detect three component strain in a borehole. Numerals 311 and 321 show wires for detectors 310 and 320, respectively. Numerals 341 and 342 are wires for the detectors of another strain meter, set up on the lower part or the borehole.

Figure 15:
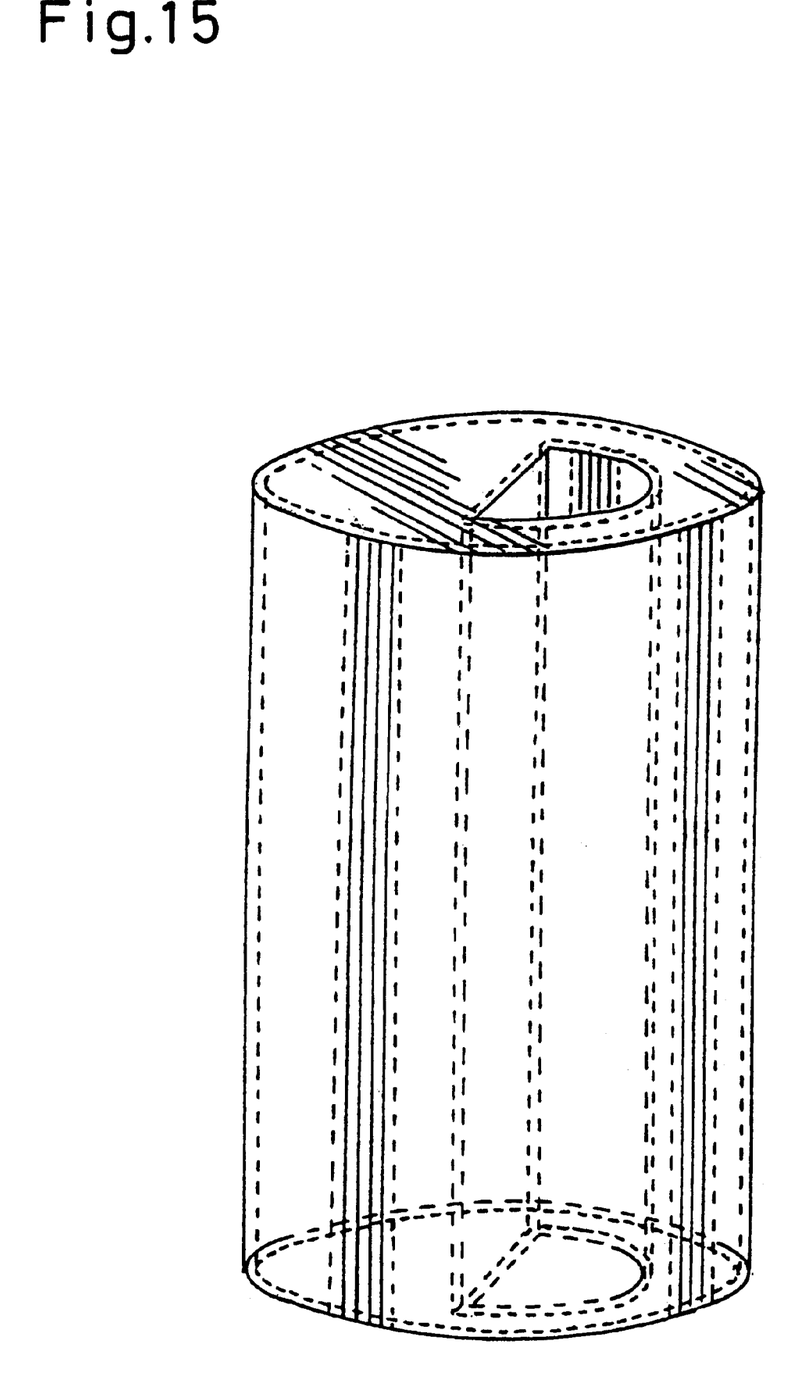
FIG. 15 is also a view in perspective of a closed receptacle having a semicylindrical cavity near the middle of the receptacle. Instruments are also placed inside the receptacle so as to make a hollow space near the middle of the receptacle.

Strain meters shown in FIGS. 10, 11, 12, 13, 14, and 15 are characterized by having a cavity near the middle of the strain meter. Wires for electric signal lines and/or power lines of another strain meters can be passed through this cavity. Therefore, many strain meter can easily be installed in the same borehole. If moistureproofing is needed, the receptacle shown in FIG. 14 and/or FIG. 15 is suitable for the borehole strain meter. These strain meters are very useful for making an array observation of strain in the ground and/or a solid construction. It is to be understood that the invention is not limited to the precise embodiment described above and that minor modifications may be made within the scope of the invention.

What is claimed is:

1. A borehole strain meter for measuring expansion or contraction of the ground or a solid construction comprising:

a hollow cylindrical receptacle having inner and outer walls;

a pair of lever arms having first and second ends, one end of each of said arms being fixed to said inner wall of the receptacle and the other end of each of said arms being free;

displacement detecting means placed on the free end of the arms near a lateral side of the receptacle to measure the displacement between the free end of the arms and the inner wall of the receptacle opposite the free end;

power lines for powering said detecting means;

recorder means installed at the ground for recording the signals from the detecting means;

wires placed near said lateral side of said receptacle for transmitting electrical signals from said detecting means to recorder means and power lines;

wherein the middle of receptacle has sufficient cavity for inserting wires of plurality of other strain meters which are installed in lower parts of the said borehole, whereby a multiple instruction is achieved.

* * * * *